United States Patent
Tang et al.

(10) Patent No.: US 8,937,984 B2
(45) Date of Patent: Jan. 20, 2015

(54) METHOD AND DEVICE FOR ELIMINATING INTERFERENCE IN MOBILE COMMUNICATION SYSTEM

(75) Inventors: Zhixun Tang, Beijing (CN); Liang Zhuang, Beijing (CN)

(73) Assignee: ST-Ericsson Semiconductor (Beijing) Co., Ltd, Beijing (CN)

( * ) Notice: Subject to any disclaimer, the term of this patent is extended or adjusted under 35 U.S.C. 154(b) by 0 days.

(21) Appl. No.: 13/883,148

(22) PCT Filed: Nov. 3, 2011

(86) PCT No.: PCT/CN2011/081722
§ 371 (c)(1),
(2), (4) Date: Jul. 8, 2013

(87) PCT Pub. No.: WO2012/059058
PCT Pub. Date: May 10, 2012

(65) Prior Publication Data
US 2013/0294482 A1 Nov. 7, 2013

(30) Foreign Application Priority Data
Nov. 5, 2010 (CN) .......................... 2010 1 0537589

(51) Int. Cl.
*H04B 1/00* (2006.01)
*H04B 1/7103* (2011.01)
*H04B 1/711* (2011.01)
*H04J 11/00* (2006.01)
*H04L 25/03* (2006.01)

(52) U.S. Cl.
CPC .............. *H04B 1/7103* (2013.01); *H04B 1/711* (2013.01); *H04J 11/0046* (2013.01); *H04L 25/03305* (2013.01); *H04L 25/03331* (2013.01)
USPC ........... 375/144; 375/131; 375/140; 375/229; 375/295; 375/316

(58) Field of Classification Search
CPC ............. H04B 1/7093; H04B 1/71052; H04B 1/71075; H04B 1/71072; H04B 1/71055; H04B 7/0854; H04B 1/7105; H04B 1/7115; H04B 7/0669; H04B 7/0897; H04B 1/7103; H04B 2201/70702; H04B 1/7107; H04B 7/2628; H04L 1/06; H04L 25/0212; H04L 25/0226; H04L 25/03305; H04L 25/03318; H04L 1/005; H04L 1/0618; H04L 25/0224; H04L 25/03063; H04L 2025/03414; H04L 1/08; H04L 2025/03375; H04L 2025/03426
USPC ......... 375/130, 131, 135, 136, 140, 144, 146, 375/147, 150, 219, 229, 295, 316, 346
See application file for complete search history.

(56) References Cited

U.S. PATENT DOCUMENTS
7,809,045 B2 * 10/2010 Visoz et al. ................... 375/144
2007/0217386 A1 * 9/2007 Visoz et al. ................... 370/339
(Continued)

FOREIGN PATENT DOCUMENTS
CN 1885727 A 12/2006
CN 1973475 A 5/2007
CN 102035568 A 4/2011

OTHER PUBLICATIONS
International Search Report issued in corresponding International application No. PCT/CN2011/081722, mailing date Feb. 16, 2012.

*Primary Examiner* — Hirdepal Singh
(74) *Attorney, Agent, or Firm* — Patent Portfolio Builders PLLC

(57) ABSTRACT

The present invention relates to the field of communication technology, and provides a method and a device for eliminating interference in a mobile communication system. The method comprises: step 1: re-constructing signal estimation $\hat{d}_{MAI+ISI}$ of inter-symbol interference and multi-access interference in accordance with an output signal $\hat{d}_{esb}$ from an equalizer; and step 2: performing interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated. According to the present invention, it is able to eliminate the impact of an interference signal and improve the receptivity of a receiver for a useful signal.

6 Claims, 3 Drawing Sheets

(56) References Cited

U.S. PATENT DOCUMENTS

2008/0019429 A1* 1/2008 Reznik ............................ 375/148
2008/0267265 A1 10/2008 Cairns et al.
2009/0296786 A1* 12/2009 Massicotte et al. ............ 375/148
2010/0165949 A1* 7/2010 Dabak et al. ................... 370/331
2010/0309956 A1* 12/2010 Li et al. ........................... 375/144
2011/0064066 A1* 3/2011 Lamba et al. .................. 370/342

* cited by examiner

METHOD AND DEVICE FOR ELIMINATING INTERFERENCE IN MOBILE COMMUNICATION SYSTEM

TECHNICAL FIELD

The present invention relates to a field of communication technology, in particular to a method and a device for eliminating interference in a Time Division Synchronous Code Division Multiple Access (TD-SCDMA) mobile communication system.

BACKGROUND

A code division multiple access technology is used in a Direct Spreading CDMA (DS-CDMA) system. Due to different propagation delays for different signals and the existence of scramble codes, the spreading code sets adopted by the respective signal are not completely orthogonal to each other. Such an interference caused by a non-zero cross-correlation coefficient is usually called as Multiple Access Interference (MAI).

Usually, a Matched Filter (MF, where a traditional Rake receiver just conforms to the MF principle) or a Multi-User Detector (MUD) is used in a CDMA system to recover data before being spread and scrambled. The traditional MF device is impossible to suppress multi-access interference effectively, while the MUD can eliminate the impact of MAI in a better manner.

In a TD-SCDMA system, Joint Detector (JD) is adopted by the MUD. As a linear MUD, it needs to complete a system matrix inversion operation. As a result, when a large Spread Factor (SF) or a long scrambler is used by the CDMA system or there exist too many interference users, the dimensions of the system matrix will increase and the computation load of the matrix inversion will become unacceptable.

The existing multi-user detection technology cannot eliminate interference signals effectively, so there exists a need to improve such a technology.

SUMMARY

In order to solve the above-mentioned problem, an object of the present invention is to provide a method and a device for eliminating interference in a mobile communication system, thereby to eliminate the impact of an interference signal and improve the receptivity of a receiver for a useful signal.

In order to achieve the above object, the present invention provides a method for eliminating interference in a mobile communication system, comprising:

step 1: re-constructing signal estimation $\hat{d}_{MAI+ISI}$ of inter-symbol interference and multi-access interference in accordance with an output signal $\hat{d}_{esb}$ from an equalizer; and step 2: performing interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated.

Preferably, in step 1, the signal estimation $\hat{d}_{MAI+ISI}$ of inter-symbol interference and multi-access interference is re-constructed by using the equation $\hat{d}_{MAI+ISI}=\overline{\mathrm{diag}(A^H A)}\hat{d}_{esb}$, wherein A represents a system matrix, function $\overline{\mathrm{diag}(.)}$ represents a matrix generated after a diagonal entry is set to 0.

Preferably, in step 2, the interference elimination is performed by using the equation $\hat{d}_{JD+IC}=(\mathrm{diag}(A^H A))^{-1}\hat{e}_{MF}-(\mathrm{diag}(A^H A))^{-1}\hat{d}_{MAI+ISI}$, wherein function $(.)^{-1}$ represents matrix inversion, and function $\mathrm{diag}(.)$ represents a matrix generated after an off-diagonal entry is set to 0.

Preferably, in step 2, the interference elimination is performed by using the equation $\hat{d}_{JD+IC}=(\mathrm{diag}(A^H A))^{-1}(\hat{e}_{MF}-\hat{d}_{MAI+ISI})$, wherein function $(.)^{-1}$ represents matrix inversion, and function $\mathrm{diag}(.)$ represents a matrix generated after an off-diagonal entry is set to 0.

The present invention further provides a device for eliminating interference, comprising:

an inter-symbol interference and multi-access interference re-constructor configured to re-construct signal estimation $\hat{d}_{MAI+ISI}$ of inter-symbol interference and multi-access interference in accordance with an output signal $\hat{d}_{esb}$ from an equalizer; and an interference eliminator configured to perform interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated.

Preferably, the inter-symbol interference and multi-access interference re-constructor is configured to re-construct the signal estimation $\hat{d}_{MAI+ISI}$ of inter-symbol interference and multi-access interference by using the equation $\hat{d}_{MAI+ISI}=\overline{\mathrm{diag}(A^H A)}\hat{d}_{esb}$, wherein A represents a system matrix, function $\overline{\mathrm{diag}(.)}$ represents a matrix generated after a diagonal entry is set to 0.

Preferably, the interference eliminator is configured to perform interference elimination by using the equation $\hat{d}_{JD+IC}=(\mathrm{diag}(A^H A))^{-1}\hat{e}_{MF}-(\mathrm{diag}(A^H A))^{-1}\hat{d}_{MAI+ISI}$, wherein function $(.)^{-1}$ represents matrix inversion, and function $\mathrm{diag}(.)$ represents a matrix generated after an off-diagonal entry is set to 0.

Preferably, the interference eliminator is configured to perform interference elimination by using the equation $\hat{d}_{JD+IC}=(\mathrm{diag}(A^H A))^{-1}(\hat{e}_{MF}-\hat{d}_{MAI+ISI})$, wherein function $(.)^{-1}$ represents matrix inversion, and function $\mathrm{diag}(.)$ represents a matrix generated after an off-diagonal entry is set to 0.

According to the above technical solutions, the present invention has the following beneficial effects. Signal estimation $\hat{d}_{MAI+ISI}$ of inter-symbol interference and multi-access interference is re-constructed in accordance with an output signal $\hat{d}_{esb}$ from an equalizer, and then interference elimination is performed on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated. As a non-linear multi-user detection technology, the present invention, without remarkably increasing the complexity of the existing JD method, can suppress the impact of the inter-symbol interference and multi-access interference on a useful signal in a better manner and improve the receptivity of a receiver for the useful signal,

DETAILED DESCRIPTION

In order to make the objects, the technical solutions and the advantages of the present invention more apparent, the present invention will be described hereinafter in details in conjunction with the embodiments and the drawings. Here, the embodiments and the descriptions thereof are merely for illustrative purpose, but cannot be regarded as limitations to the present invention.

The present invention may be applied to either a TD-SCDMA system or a DS-SCDMA system. For easy understanding, the TD-SCDMA system is taken hereinafter as an example, and the parameters thereof are shown in Table 1.

| Number of Cells | 1 |
| Midamble Number | 1 |
| Modulation Mode | QPSK |
| Number of Tx Antennas | 1 |
| Number of Rx Antennas | 1 |
| Number of Codes | 16 |
| Code Number | 1~16 |
| Number of Timeslots | 1 |

Figure 1:
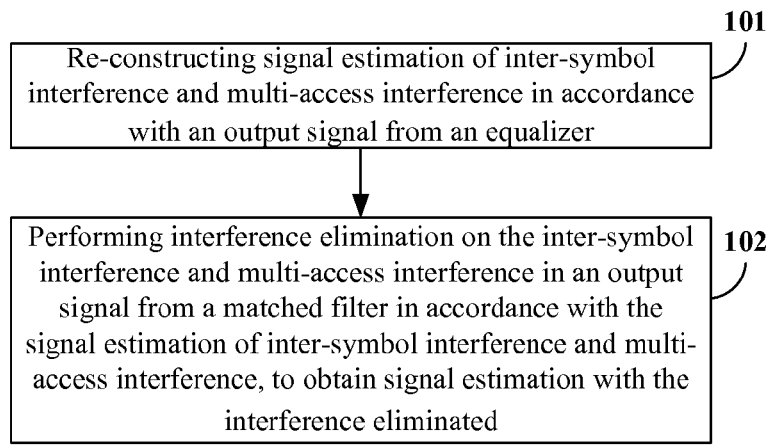
FIG. 1 is a flow chart of a method for eliminating interference according to embodiments of the present invention.

Referring to FIG. 1, which is a flow chart of a method for eliminating interference according to an embodiment of the present invention, the method comprises the following steps.

Step 101: re-constructing signal estimation $\hat{d}_{MAI+ISI}$ of inter-symbol interference and multi-access interference in accordance with an output signal $\hat{d}_{esb}$ from an equalizer.

In this step, the signal estimation $\hat{d}_{MAI+ISI}$ of inter-symbol interference and multi-access interference may be re-constructed by using the following equation (1):

$$\hat{d}_{MAI+ISI} = \overline{\mathrm{diag}(A^H A)} \hat{d}_{esb} \quad (1)$$

wherein A represents a system matrix, and function $\overline{\mathrm{diag}(.)}$ represents a matrix generated after a diagonal entry is set to 0.

In this embodiment, presumed that $d_{esb} = \{d_1^1 d_1^1 \ldots d_1^{K_{vru}} d_2^1 \ldots d_2^{K_{vru}} d_3^1 \ldots d_3^{K_{Vru}} \ldots d_{22}^1 \ldots d_{22}^{K_{vru}}\}$, wherein $K_{vru}$ represents the number of virtual codes and $K_{vru}=16$, and $$A^H A = R = \begin{bmatrix} R_0 & R_1 & 0 & \ldots & 0 & 0 \\ R_1^H & R_0 & R_1 & \ldots & 0 & 0 \\ 0 & R_1^H & R_0 & \ldots & 0 & 0 \\ \vdots & \vdots & \vdots & \ddots & \vdots & \vdots \\ 0 & \ldots & 0 & R_1^H & R_0 & R_1 \\ 0 & 0 & \ldots & 0 & R_1^H & R_0 \end{bmatrix}.$$

At this time, $$\hat{d}_{MAI+ISI} = \overline{\mathrm{diag}} \begin{bmatrix} R_0 & R_1 & 0 & \ldots & 0 & 0 \\ R_1^H & R_0 & R_1 & \ldots & 0 & 0 \\ 0 & R_1^H & R_0 & \ldots & 0 & 0 \\ \vdots & \vdots & \vdots & \ddots & \vdots & \vdots \\ 0 & \ldots & 0 & R_1^H & R_0 & R_1 \\ 0 & 0 & \ldots & 0 & R_1^H & R_0 \end{bmatrix} \begin{pmatrix} d_1^1 \\ \vdots \\ d_{21}^{K_{vru}} \\ d_{22}^1 \\ \vdots \\ d_{22}^{K_{vru}} \end{pmatrix},$$

and further, $$\hat{d}_{MAI+ISI}(i) = \left[ \sum_{j=0, j\neq i}^{22K_{vru}-1} R(i,j) d_{[\frac{i}{K_{vru}}]+1}^{(i \bmod K_{vru})+1} \right],$$

wherein i=0, 1, ..., 703.

Step 102: performing interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated.

In this embodiment, the interference elimination may be performed by using the following equation (2) or (3):

$$\hat{d}_{JD+IC} = (\mathrm{diag}(A^H A))^{-1} \hat{e}_{MF} (\mathrm{diag}(A^H A))^{-1} \hat{d}_{MAI+ISI} \quad (2)$$

$$\hat{d}_{JD+IC} (\mathrm{diag}(A^H A))^{-1} (\hat{e}_{MF} - \hat{d}_{MAI+ISI}) \quad (3)$$

wherein function $(.)^{-1}$ represents matrix inversion, and function diag(.) represents a matrix generated after an off-diagonal entry is set to 0.

In this step, if $R'_{0i,i}=1/R0i,i$, then $\hat{d}_{JD+IC}(i)=R'_{0i\%16,i\%16} \times \hat{e}_{MF}(i) - R'_{0i\%16,i\%16} \times \hat{d}_{MAI+ISI}(i)$ (i=0, 1, ..., 703), or $\hat{d}_{JD+IC}(i)=R'_{0i\%16,i\%16} \times (\hat{e}_{MF}(i) - \hat{d}_{MAI+ISI}(i))$ (i=0, 1, ..., 703), wherein % represents a modulo operation.

Means for eliminating interference is positioned after the equalizer in the joint detection. Before demodulation, the input signals into the means include the output signal $\hat{d}_{esb}$ from the equalizer and the output signal $\hat{e}_{MF}$ from the matched filter. The output signal from the means is the signal $\hat{d}_{JD+IC}$ with the interference eliminated.

Figure 2:
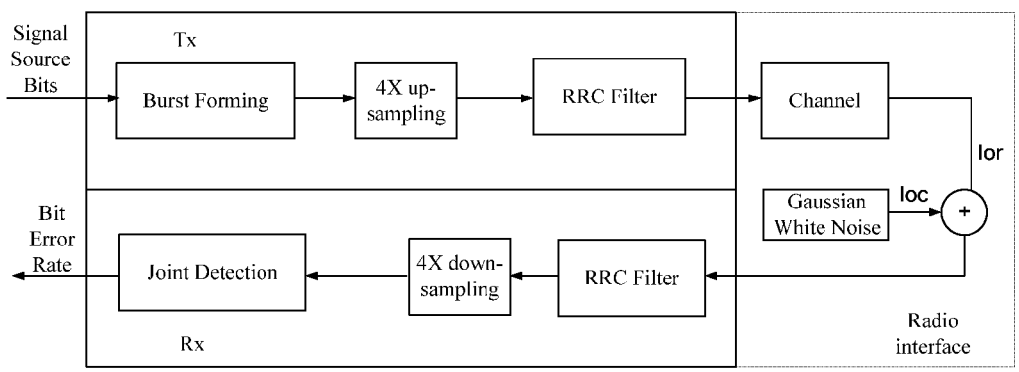
FIG. 2 is a block diagram showing a simulation platform according to embodiments of the present invention.

The present invention can suppress the impact of MAI on the useful signal based on a joint detection algorithm, and thereby the performance of the receiver may be improved. Simulation is performed hereinafter on the TD-SCDMA system using the simulation platform as shown in FIG. 2, and the simulation parameters are shown in Table 2.

| Communication System | TD-SCDMA |
| Number of Cells | 1 |
| Midamble Number | 1 |
| Modulation Mode | QPSK |
| Number of Tx Antennas | 1 |
| Number of Rx Antennas | 1 |
| Spreading Factors | 16 |
| Kcell | 8 |
| Number of Timeslots | 1 |
| Simulation Code Configuration | Standard configuration (12.2K and 64K) |
| Power ratio of useful signal to interference signal | 1 |
| Fading channel | Case1 |

Under the above-mentioned simulation configuration and channel environment, the simulation result is shown in FIGS.

Figure 3:
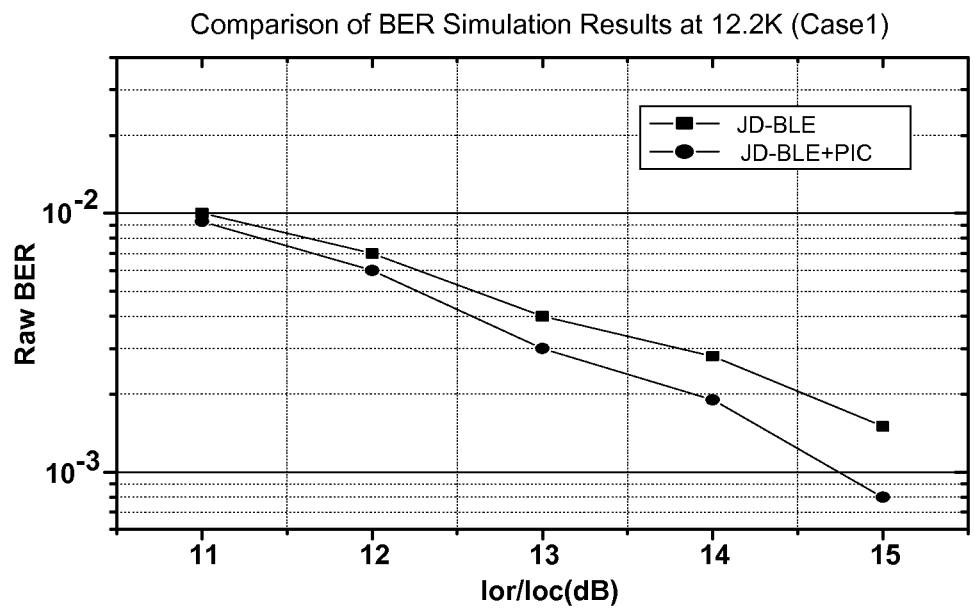
FIG. 3 is a schematic view showing the simulation result according to one embodiment of the present invention.
Figure 4:
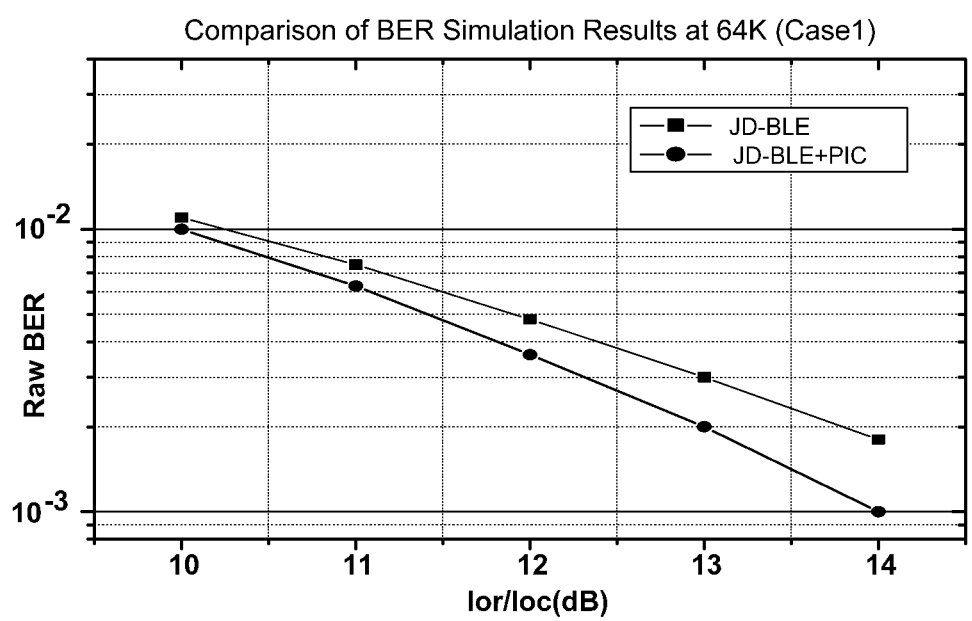
FIG. 4 is a schematic view showing the simulation result according to another embodiment of the present invention.

3 and 4, where the simulation code in FIG. 3 is 12.2K while the simulation code in FIG. 4 is 64K. The method for eliminating interference according to this embodiment (the curve with dots), with less algorithm complexity, has better performance than the traditional algorithm, in particular under a worse interference environment. "Ior/Ioc" of the horizontal axis in FIGS. 3 and 4 represents "a ratio of a total power for transmitting signals (including user signals and interference signals) to an additive white Gaussian noise (AWGN) power (dB value)", and "raw_BER" of the vertical axis represents "Bit Error Rate".

Figure 5:
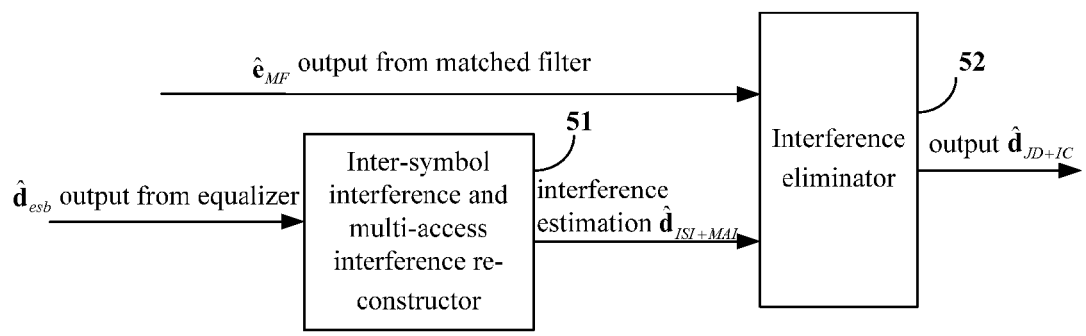
FIG. 5 is a structural schematic view showing a device for eliminating interference according to embodiments of the present invention.

Referring to FIG. 5, which is a structural schematic view showing a device for eliminating interference according to embodiments of the present invention, the device comprises:

an inter-symbol interference and multi-access interference re-constructor 51, configured to re-construct signal estimation $\hat{d}^2_{MAI+ISI}$ of inter-symbol interference and multi-access interference in accordance with an output signal $\hat{d}_{esb}$ from an equalizer; and an interference eliminator 52, configured to perform interference elimination on the inter-symbol interference and multi-access interference in an output signal $\hat{e}_m$ from a matched filter in accordance with the signal estimation $\hat{d}_{MAI+ISI}$ of inter-symbol interference and multi-access interference, to obtain signal estimation $\hat{d}_{JD+IC}$ with the interference eliminated.

In an embodiment of the present invention, the inter-symbol interference and multi-access interference re-constructor may be configured to re-construct the signal estimation $\hat{d}_{MAI+ISI}$ of inter-symbol interference and multi-access interference by using the equation $\hat{d}_{MAI+ISI}=\overline{diag(A^HA)}\hat{d}_{esb}$, wherein A represents a system matrix, function $\overline{diag(.)}$ represents a matrix generated after a diagonal entry is set to 0.

In an embodiment of the present invention, the interference eliminator 52 may be configured to perform interference elimination by using the equation $\hat{d}_{JD+IC}=(diag(A^H A))^{-1}\hat{e}_{MF}-(diag(A^H A))^{-1}\hat{d}_{MAI+ISI}$, wherein function $(.)^{-1}$ represents matrix inversion, and function $diag(.)$ represents a matrix generated after an off-diagonal entry is set to 0.

In an embodiment of the present invention, the interference eliminator 52 may be configured to perform interference elimination by using the equation $\hat{d}_{JD+IC}=(diag(A^H A))^{-1}(\hat{e}_{MF}-\hat{d}_{MAI+ISI})$, wherein function $(.)^{-1}$ represents matrix inversion, and function $diag(.)$ represents a matrix generated after an off-diagonal entry is set to 0.

The above are merely the preferred embodiments of the present invention. It should be appreciated that, a person skilled in the art may make improvements and modifications without departing from the principles of the present invention, and these improvements and modifications also fall within the scope of the present invention.

What is claimed is:

1. A method for eliminating interference in a mobile communication system, comprising:
   step 1: re-constructing signal estimation $\hat{d}_{MAI+ISI}$ of inter-symbol interference and multi-access interference in accordance with an output signal $\hat{d}_{esb}$ from an equalizer, wherein
   in step 1, the signal estimation $\hat{d}_{MAI+ISI}$ of inter-symbol interference and multi-access interference is re-constructed by using the equation $\hat{d}_{MAI+ISI}=\overline{diag(A^HA)}\hat{d}_{esb}$, wherein A represents a system matrix, function $\overline{diag(.)}$ represents a matrix generated after a diagonal entry is set to 0; and
   step 2: performing interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated.

2. A method for eliminating interference in a mobile communication system, comprising:
   step 1: re-constructing signal estimation $\hat{d}_{MAI+ISI}$ of inter-symbol interference and multi-access interference in accordance with an output signal $\hat{d}_{esb}$ from an equalizer; and
   step 2: performing interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated, wherein
   in step 2, the interference elimination is performed by using the equation $\hat{d}_{JD+IC}=(diag(A^HA))^{-1}\hat{e}_{MF}-(diag(A^HA))^{-1}\hat{d}_{MAI+ISI}$,
   wherein function $(.)^{-1}$ represents matrix inversion, and function $diag(.)$ represents a matrix generated after an off-diagonal entry is set to 0.

3. A method for eliminating interference in a mobile communication system, comprising:
   step 1: re-constructing signal estimation $\hat{d}_{MAI+ISI}$ of inter-symbol interference and multi-access interference in accordance with an output signal $\hat{d}_{esb}$ from an equalizer; and
   step 2: performing interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated, wherein
   in step 2, the interference elimination is performed by using the equation $\hat{d}_{JD+IC}=(diag(A^HA))^{-1}(\hat{e}_{MF}-\hat{d}_{MAI+ISI})$,
   wherein function $(.)^{-1}$ represents matrix inversion, and function $diag(.)$ represents a matrix generated after an off-diagonal entry is set to 0.

4. A device for eliminating interference, comprising:
   an inter-symbol interference and multi-access interference re-constructor, configured to re-construct signal estimation $\hat{d}_{MAI+ISI}$ of inter-symbol interference and multi-access interference in accordance with an output signal $\hat{d}_{esb}$ from an equalizer, wherein
   the inter-symbol interference and multi-access interference re-constructor is configured to re-construct the signal estimation $\hat{d}_{MAI+ISI}$ of inter-symbol interference and multi-access interference by using the equation $\hat{d}_{MAI+ISI}=\overline{diag(A^HA)}\hat{d}_{esb}$,
   wherein A represents a system matrix, function $\overline{diag(.)}$ represents a matrix generated after a diagonal entry is set to 0; and
   an interference eliminator, configured to perform interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated.

5. A device for eliminating interference, comprising:
   an inter-symbol interference and multi-access interference re-constructor, configured to re-construct signal estimation $\hat{d}_{MAI+ISI}$ of inter-symbol interference and multi-access interference in accordance with an output signal $\hat{d}_{esb}$ from an equalizer; and an interference eliminator, configured to perform interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated, wherein the interference eliminator is configured to perform interference elimination by using the equation $\hat{d}_{JD+IC}=(\text{diag}(A^HA))^{-1}\hat{e}_{MF}-(\text{diag}(A^HA))^{-1}\hat{d}_{MAI+ISI}$, wherein function $(.)^{-1}$ represents matrix inversion, and function diag(.) represents a matrix generated after an off-diagonal entry is set to 0.

6. A device for eliminating interference, comprising:

an inter-symbol interference and multi-access interference re-constructor, configured to re-construct signal estimation $\hat{d}_{MAI+ISI}$ of inter-symbol interference and multi-access interference in accordance with an output signal $\hat{d}_{esb}$ from an equalizer; and an interference eliminator, configured to perform interference elimination on the inter-symbol interference and multi-access interference in an output signal $\hat{e}_{MF}$ from a matched filter in accordance with the signal estimation $\hat{d}_{MAI+ISI}$ of inter-symbol interference and multi-access interference, to obtain signal estimation $\hat{d}_{JD+IC}$ with the interference eliminated, wherein the interference eliminator is configured to perform interference elimination by using the equation $\hat{d}_{JD+IC}=(\text{diag}(A^HA))^{-1}(\hat{e}_{MF}-\hat{d}_{MAI+ISI})$, wherein function $(.)^{-1}$ represents matrix inversion, and function diag(.) represents a matrix generated after an off-diagonal entry is set to 0.

\* \* \* \* \*